US010782197B2

United States Patent
Wu et al.

(10) Patent No.: US 10,782,197 B2
(45) Date of Patent: Sep. 22, 2020

(54) METHOD FOR MEASURING SURFACE TORQUE OSCILLATION PERFORMANCE INDEX

(71) Applicant: Schlumberger Technology Corporation, Sugar Land, TX (US)

(72) Inventors: Jian Wu, Houston, TX (US); Ramakrishna Madhireddy, Houston, TX (US); Nathaniel Wicks, Somerville, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 350 days.

(21) Appl. No.: 15/846,265

(22) Filed: Dec. 19, 2017

(65) Prior Publication Data

US 2019/0187012 A1  Jun. 20, 2019

(51) Int. Cl.
   *G01L 3/10*  (2006.01)
   *E21B 44/04*  (2006.01)
   (Continued)

(52) U.S. Cl.
   CPC ............ *G01L 3/108* (2013.01); *E21B 19/166* (2013.01); *E21B 44/04* (2013.01); *E21B 45/00* (2013.01); *E21B 47/007* (2020.05)

(58) Field of Classification Search
   CPC ......... G01L 3/108; G01L 3/10; G01L 5/0061; E21B 47/0006; E21B 19/166; E21B 45/00; E21B 44/04
   See application file for complete search history.

(56) References Cited

U.S. PATENT DOCUMENTS 4,854,397 A  8/1989  Warren et al.
5,205,163 A  4/1993  Sananikone
(Continued)

FOREIGN PATENT DOCUMENTS

EP  0774563 A2  5/1997

OTHER PUBLICATIONS

Halsey et al., "Torque Feedback Used to Cure Slip-Stick Motion," SPE 18049, 63rd Annual Technical Conference and Exhibition of the Society of Petroleum Engineers, Oct. 2-5, 1988, pp. 277-282.
(Continued)

*Primary Examiner* — Mohammad K Islam
(74) *Attorney, Agent, or Firm* — Rachel E. Greene

(57) ABSTRACT

A system and method for drilling a wellbore with a drill rig by: rotating a drillstring and a drill bit with a drill rig drive system; applying a weight of the drillstring on the drill rig; measuring surface torque oscillations of the drill string via: determining a fundamental oscillation time period; select a time window based on the fundamental oscillation time period; collecting torque present value data of the drill string for the selected time window; determining an amplitude of torque oscillation from the collected torque present value data; determining a reference torque; and dividing the determined amplitude of torque oscillation by the determined reference torque to obtain a surface torque oscillation performance index, whereby the measurement of the surface torque oscillations of the drill string is a fractional value to indicate the magnitude and severity of surface torque fluctuations of the drilling string; and modifying a drilling parameter based on the surface torque oscillation performance index.

22 Claims, 7 Drawing Sheets

(51) Int. Cl.
*E21B 45/00* (2006.01)
*E21B 19/16* (2006.01)
*E21B 47/007* (2012.01)

(56) References Cited

U.S. PATENT DOCUMENTS

| | | | |
|---|---|---|---|
| 5,259,468 A | 11/1993 | Warren et al. | |
| 5,390,748 A | 2/1995 | Goldman | |
| 5,433,279 A | 7/1995 | Tessari et al. | |
| 5,467,832 A | 11/1995 | Orban et al. | |
| 5,474,142 A | 12/1995 | Bowden | |
| 5,738,178 A | 4/1998 | Williams et al. | |
| 5,842,149 A | 11/1998 | Harrell et al. | |
| 6,050,348 A | 4/2000 | Richarson et al. | |
| 6,166,654 A | 12/2000 | Van Den Steen | |
| 6,327,539 B1 | 12/2001 | Keultjes et al. | |
| 6,338,390 B1 | 1/2002 | Tibbitts | |
| 6,382,331 B1 | 5/2002 | Pinckard | |
| 6,802,378 B2 | 10/2004 | Haci et al. | |
| 7,152,696 B2 | 12/2006 | Jones | |
| 7,404,454 B2 | 7/2008 | Hulick | |
| 7,461,705 B2 | 12/2008 | Hulick et al. | |
| 7,588,100 B2 | 9/2009 | Hamilton | |
| 7,802,634 B2 | 9/2010 | Boone | |
| 7,823,655 B2 | 11/2010 | Boone et al. | |
| 8,360,171 B2 | 1/2013 | Boone et al. | |
| 8,387,720 B1 | 3/2013 | Keast et al. | |
| 8,528,663 B2 | 9/2013 | Boone | |
| 8,589,136 B2* | 11/2013 | Ertas | E21B 7/00 703/10 |
| 8,602,126 B2 | 12/2013 | Boone et al. | |
| 8,672,055 B2 | 3/2014 | Boone et al. | |
| 8,689,906 B2 | 4/2014 | Nessjoen et al. | |
| RE44,956 E | 6/2014 | Richardson et al. | |
| RE44,973 E | 7/2014 | Richardson et al. | |
| 8,798,978 B2* | 8/2014 | Ertas | E21B 45/00 703/10 |
| 8,833,488 B2 | 9/2014 | Knudsen et al. | |
| 8,939,233 B2 | 1/2015 | Edbury et al. | |
| 8,939,234 B2 | 1/2015 | Mebane, III et al. | |
| 8,950,512 B2 | 2/2015 | Nessjoen et al. | |
| 9,249,655 B1 | 2/2016 | Keast et al. | |
| 9,290,995 B2 | 3/2016 | Boone et al. | |
| 9,359,881 B2 | 6/2016 | DiSantis | |
| 9,506,336 B2 | 11/2016 | Orbell | |
| 9,581,008 B2 | 2/2017 | Kyllingstad | |
| 9,593,567 B2 | 3/2017 | Pink et al. | |
| 9,598,904 B2 | 3/2017 | Aldred et al. | |
| 9,650,880 B2 | 5/2017 | Bowley et al. | |
| 2008/0000688 A1* | 1/2008 | McLoughlin | E21B 44/00 175/40 |
| 2011/0186353 A1 | 8/2011 | Turner et al. | |
| 2012/0123757 A1* | 5/2012 | Ertas | E21B 44/00 703/2 |
| 2012/0130693 A1* | 5/2012 | Ertas | E21B 45/00 703/2 |
| 2013/0341091 A1* | 12/2013 | Sugiura | G05B 15/02 175/24 |
| 2014/0277752 A1* | 9/2014 | Chang | E21B 44/00 700/275 |
| 2015/0012253 A1* | 1/2015 | O'Donnell | G06F 30/20 703/2 |
| 2015/0107897 A1 | 4/2015 | Nessjoen et al. | |
| 2016/0047219 A1 | 2/2016 | Jeffryes | |
| 2016/0054729 A1* | 2/2016 | Payette | E21B 45/00 700/275 |
| 2016/0076354 A1* | 3/2016 | Lai | E21B 47/0006 702/9 |
| 2016/0168973 A1 | 6/2016 | Dykstra et al. | |
| 2016/0194649 A1 | 7/2016 | Yofin | |
| 2016/0237802 A1 | 8/2016 | Boone et al. | |
| 2016/0273332 A1 | 9/2016 | Dwars et al. | |
| 2016/0281488 A1 | 9/2016 | Dwars et al. | |
| 2016/0290046 A1 | 10/2016 | Orban et al. | |
| 2017/0101861 A1 | 4/2017 | Kyllingstad | |
| 2017/0183940 A1* | 6/2017 | Bailey | G01N 29/4472 |
| 2018/0119535 A1* | 5/2018 | Shen | E21B 41/0092 |
| 2018/0283161 A1* | 10/2018 | Bailey | E21B 45/00 |
| 2019/0187012 A1* | 6/2019 | Wu | E21B 45/00 |

OTHER PUBLICATIONS

Kyllingstad et al., "A Study of Slip/Stick Motion of the Bit," SPE Drilling Engineering, pp. 369-373, Dec. 1988.

Grigg et al., "Predicting Phase Behavior of Mixtures of Reservoir Fluids With Carbon Dioxide", SPE 11960, Society of Petroleum Engineers of AIME, 1983, 12 pages.

Stockhausen et al., "Continuous Direction and Inclination Measurements Lead to an Improvement in Wellbore Positioning", SPE/IADC 79917, SPE/IADC Drilling Conference, 2003, 16 pages.

* cited by examiner

METHOD FOR MEASURING SURFACE TORQUE OSCILLATION PERFORMANCE INDEX

TECHNICAL FIELD

The present disclosure relates generally to the field of drilling wells. More particularly, the invention concerns measuring a surface torque oscillation performance index for controlling drilling operations, starting/stopping stick slip mitigation controls, and performance comparisons between drill rigs and stick slip mitigation control algorithms.

BACKGROUND

Top drive is a drilling rig equipment that is located above the rig floor and moves vertically along the derrick. It is a rotational mechanical device providing primarily the torque that is needed by the drilling bit to drill through formations. Top drive is mostly controlled by an AC/DC variable frequency drive (VFD). The VFD calculates and reports the torque values to the rig control system.

High amplitude rotational oscillations of the drillstring are a common problem while drilling. They are generated by the combination of the torque generated by the interaction of the bit with the hole-bottom and of the drillstring with the borehole walls, and the lack of damping of the rotational oscillations. One of the reasons that there is so little damping is that the bit-rock interaction does not provide any damping, and indeed can amplify the oscillations.

As explained in SPE 18049, slip-stick motion of the bottom hole assembly can be regarded as extreme, self-sustained oscillations of the lowest torsional mode, called the pendulum mode. Such a motion is characterized by finite time intervals during which the bit is non-rotating and the drill pipe section is twisted by the rotary table or top drive. When the drillstring torque reaches a certain level (determined by the static friction resistance of the bottom hole assembly), the bottom hole assembly breaks free and speeds up to more than twice the nominal speed before it slows down and again comes to a complete stop. It is obvious that such motion represents a large cyclic stress in the drill pipe that can lead to fatigue problems. In addition, the high bit speed level in the slip phase can induce severe axial and lateral vibrations in the bottom hole assembly which can be damaging to the connections. Finally, it is likely that drilling with slip-stick motion leads to excessive bit wear and also a reduction in the penetration rate. Frequency analysis of the driving torque associated with torsional drillstring vibrations, in particular slip-stick oscillations, reveals that a large number of torsional drillstring resonances. The sharpness of the curve at the drillstring resonance frequencies suggest there is little damping of torsional drillstring vibrations. Halsey, Kyllingstad, and Kylling, "Torque Feedback Used to Cure Slip-Stick Motion," SPE 18049, 1988.

Stick slip generates torsional waves travelling from the bottom of the drillstring back to the surface which are seen at the top drive torque readings, which show oscillations in different degrees of magnitude. Few prior art methods systematically establish a surface torque oscillation measure. US2016/0076354, incorporated herein in its entirety, discloses a method for detecting stick-slip in a drill string by measuring the surface torque values from at least one sensor over a selected time period. The measured values are filtered using a band pass filter and the frequency band of the filter is dynamically adjusted based on the determined bit depth. The minimum and maximum torque values are captured from the filtered data and a difference is determined using these two values. The surface stick slip index (SSSI) is determined by dividing the difference of the maximum and minimum torque values by a moving average torque (times 2) over a constant selected time period.

Potential concerns regarding this method of determining the SSSI include: (1) the variable reference torque at the denominator; and (2) a fixed time period. First, SSSI is a fractional value with both numerator and denominator changing. The values of both numerator and denominator at the time have to be known to determine the magnitude of oscillation. Using a moving average torque over a selected time period to calculate the SSSI may not be an ideal way of representation of the stick slip when encountering different formations where the average torque could be significantly different for the same amount of magnitude (Max Torque-Min Torque) of the oscillation. Second, SSSI uses a sliding time window of selected time period to determine the maximum and minimum torque values. It may not be efficient to use a fixed time period as the oscillation time period varies greatly with hole depth or string length. A fixed time period may have to use an unnecessarily large value to be long enough to cover the cycle.

Thus, there is a need for a method and system that systematically establishes the surface torque oscillation measure.

SUMMARY

In accordance with the teachings of the present disclosure, disadvantages and problems associated with providing a measure of rotational oscillations are overcome by providing a Surface Torque Oscillation Performance Index (STOPI). STOPI is a fractional value to indicate the magnitude and severity of surface torque fluctuations of a drilling rig, whose numerator is the difference between the calculated maximum surface torque value and the minimum one in a dynamically specified time period, and denominator is a configurable constant torque value, e.g., top drive rated torque. STOPI is calculated in real time, updated in a preset short time period and reported to an external display. Therefore, the denominator is a constant reference torque, and the varying time window corresponds to the fundamental frequency of the drill string so as to provide a more responsive and current solution. The STOPI provides a good way for a human drilling operator or a computer controller to visualize whether slip stick oscillations are happening, and if yes, mitigate via human or computer interventions.

It may be helpful to drilling personnel, particularly when downhole measurements are not available, to establish an effective measure of surface torque oscillations (STOPI). On aspect of the invention is for drilling personnel to use STOPI to: (1) be aware of how much the surface torque oscillates during drilling operation and accordingly adjust the rotational speed, weight on bit, and/or rate of penetration to improve the situation; (2) decide whether to start, stop or modify slip stick mitigation controls, if the drilling rig is equipped with slip stick mitigation controls; and (3) provide a universal standard for performance comparisons between drilling rigs and/or mitigation control algorithms.

Another aspect of the invention is to provide a method for drilling a wellbore with a drill rig, the method comprising: rotating a drillstring and a drill bit with a drill rig drive system; applying a weight of the drillstring on the drill rig; measuring surface torque oscillations of the drill string, comprising: determining a fundamental oscillation time period; selecting a time window based on the fundamental oscillation time period; collecting torque present value data of the drill string for the selected time window; determining an amplitude of torque oscillation from the collected torque present value data; determining a reference torque; and dividing the determined amplitude of torque oscillation by the determined reference torque to obtain a surface torque oscillation performance index, whereby the measurement of the surface torque oscillations of the drill string is a fractional value to indicate the magnitude and severity of surface torque fluctuations of the drilling string; and modifying a drilling parameter based on the surface torque oscillation performance index.

Another aspect of the invention provides a controller of a drill rig system having a drillstring and a drill bit, the controller comprising: a rotation receptor that receives a signal corresponding to drillstring rotation speed at the drill rig; a torque receptor that receives a signal corresponding to torque applied to the drillstring at the drill rig; a processor; a non-transitory storage medium; and a set of computer readable instructions stored in the non-transitory storage medium, wherein when the instructions are executed by the processor allow the controller to measure surface torque oscillations of the drill string by: determining a fundamental oscillation time period; selecting a time window based on the fundamental oscillation time period; collecting torque present value data of the drill string for the selected time window; determining an amplitude of torque oscillation from the collected torque present value data; determining a reference torque; and dividing the determined amplitude of torque oscillation by the determined reference torque to obtain a surface torque oscillation performance index, whereby the measurement of the surface torque oscillations of the drill string is a fractional value to indicate the magnitude and severity of surface torque fluctuations of the drilling string.

BRIEF DESCRIPTION OF THE DRAWINGS

A more complete understanding of the present embodiments may be acquired by referring to the following description taken in conjunction with the accompanying drawings, in which like reference numbers indicate like features.

DETAILED DESCRIPTION

Preferred embodiments are best understood by reference to FIGS. 1-6C below in view of the following general discussion. The present disclosure may be more easily understood in the context of a high level description of certain embodiments.

Figure 1:
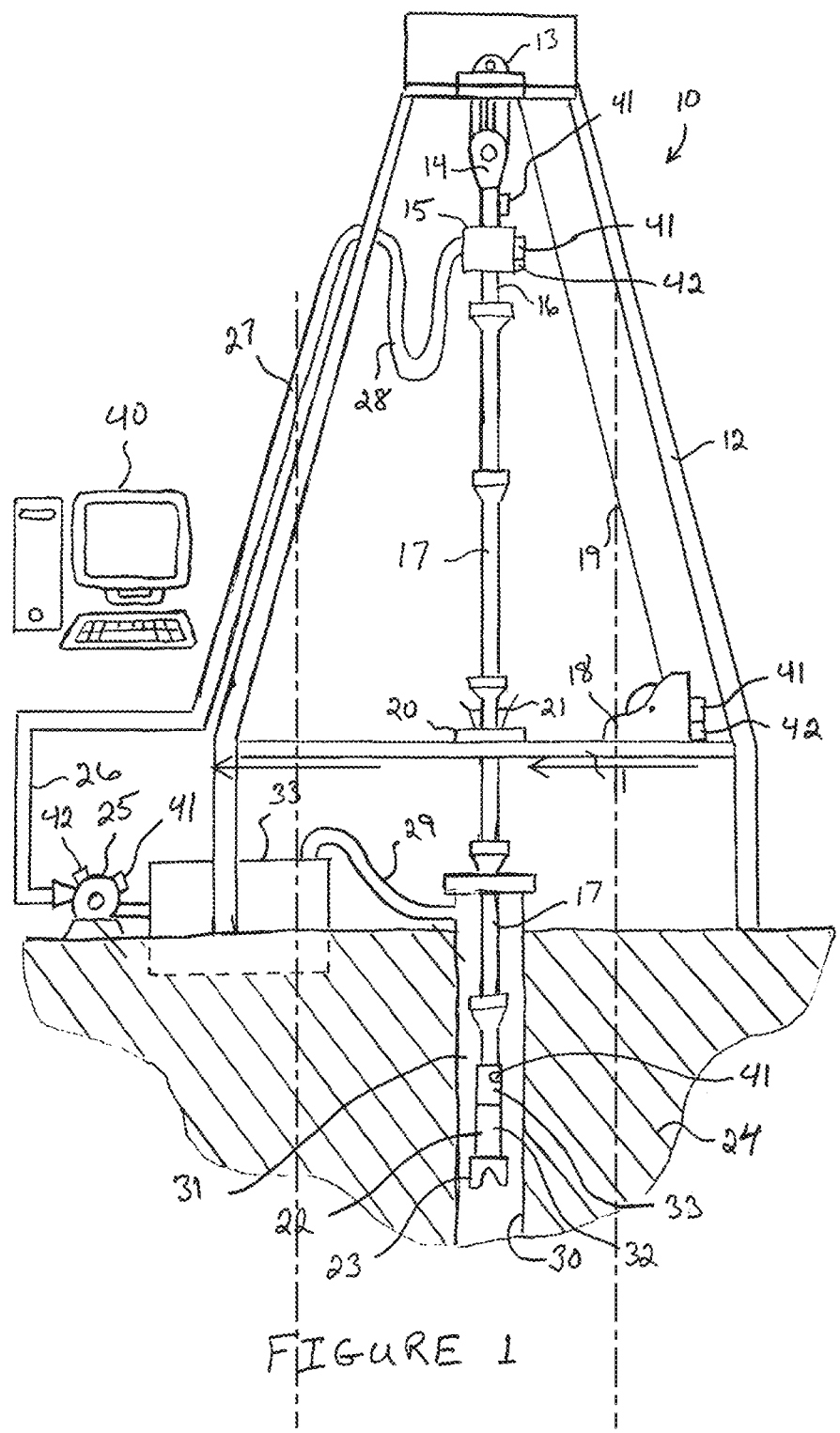
FIG. 1 illustrates a basic diagram of a drill rig in the process of drilling a well wherein there is a control system.

FIG. 1 is a basic diagram of a drill rig 10 in the process of drilling a well. The drilling rig 10 comprises a drilling rig floor 11 that is elevated and a derrick 12 that extends upwardly from the floor. A crown block 13 is positioned at the top of the derrick 12 and a traveling block 14 is suspended therefrom. The traveling block 14 may support a top drive 15. A quill 16 extends from the bottom side of the top drive 15 and is used to suspend and/or turn tubular drilling equipment as it is raised/lowered in the wellbore 30. A drillstring 17 is made up to the quill 16, wherein the drillstring 17 comprises a total length of connected drill pipe stands, or the like, extending into the well bore 30. One or more motors housed in the top drive 15 rotate the drillstring 17. A drawworks 18 pays out and reels in drilling line 19 relative to the crown block 13 and traveling block 14 so as to hoist/lower various drilling equipment.

As shown in FIG. 1, a new stand of drillstring 17 has been made up as the lower portion of the drillstring 17 is suspended from the rig floor 11 by a rotary table 20. Slips 21 secure the suspended portion of the drillstring 17 in the rotary table 20. A bottom hole assembly 22 is fixed to the lower end of the drillstring 17 and includes: a drill bit 23 for drilling through a formation 24; a positive displacement motor (PDM) 32; and a measurement while drilling (MWD) module 33.

During the drilling process, drilling mud may be circulated through the wellbore 30 to remove cuttings from around the drill bit 23. A mud pump 25 pumps the drilling mud through a discharge line 26, stand pipe 27, and rotary hose 28 to supply drilling mud to the top drive 15. Drilling mud flows from the top drive 15 down through the drillstring 17, where it exits the drillstring 17 through the drill bit 23. From the drill bit 23, the drilling mud flows up through an annulus 31 existing between the wellbore 30 and the drillstring 17 so as to carry cuttings away from the drill bit 23. A return line 29 allows the drilling mud to flow from the top of the annulus 31 into a mud pit 33. Of course, the mud pump 25 is supplied drilling mud from the mud pit 33. The drilling mud typically passes through a series of shakers, separators, etc. (not shown) to separate the cuttings from the drilling mud before the mud is circulated again by the mud pump 25.

Referring again to FIG. 1, a rig control system 40 may be used to determine whether slip stick oscillations are occurring. The rig control system 40 may be configured to receive drilling parameter data and drilling performance data related to operations of the drilling rig 10. The drilling parameter data and drilling performance data may comprise measurements monitored by a number of sensors 41 placed about the drilling rig 10, e.g., a top drive VFD, a torque sub, the drawworks 18, the traveling block 14, the top drive 15, the mud pump 25, and the measurement while drilling (MWD) module 33 as shown in the illustrated embodiment. The sensors 41 may monitor current, voltage, resistivity, force, position, torque, weight, strain, speed, rotational speed, oscillation or any other measurement related to drilling parameters or drilling performance, and relevant input may be aggregated as raw sensor measurements or as scaled engineering values. The rig control system 40 may receive drilling parameter data and drilling performance data directly from the sensors 41, retrofitted to certain pieces of equipment on the drilling rig 10, such that the sensors 41 effectively form part of the drilling system. This type of data acquisition may allow for higher sampling rates to be used for monitoring relevant drilling parameters and drilling performance metrics.

Several components of the drill rig 10 may also comprise control actuators 42. For example, the drawworks 18 may comprise an actuator 42 that allows a controller to control the workings of the drawworks 18. The top drive 15 and mud pump 25 may also have actuators 42. The actuators 42 allow a supervisory controller to control various aspects of the drilling process, for example: bit rotation speed, drillstring rotation direction, weight on bit, drilling mud fluid pressure, drilling mud fluid flow rate, drilling mud density, etc.

Figure 2:
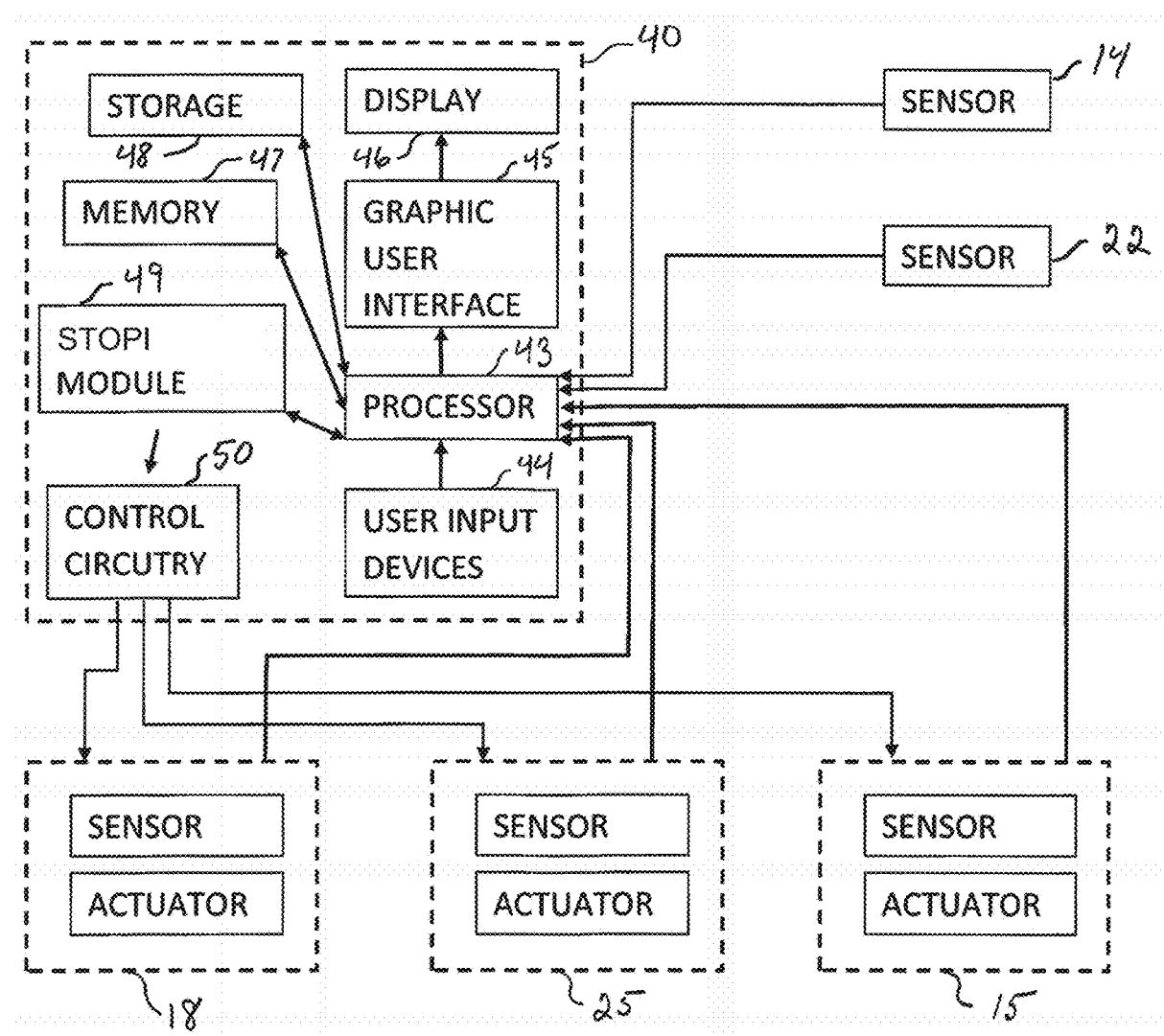
FIG. 2 shows a schematic diagram of a rig control system and other drilling rig components.

Referring to FIG. 2, a schematic of a rig control system 40 and other drilling rig components is illustrated. The rig control system 40 may comprise a processor 43 that may receive various inputs, such as the drilling parameter data and drilling performance data, from sensors 41. In addition, the processor 43 may be operably coupled to a memory 47 and a storage 48 to execute computer executable instructions for carrying out the presently disclosed techniques. These instructions may be encoded in software/hardware programs and modules that may be executed by the processor 43. The computer codes may be stored in any suitable article of manufacture that includes at least one tangible non-transitory, computer-readable medium (e.g., a hard drive) that at least collectively stores these instructions or routines, such as the memory 47 or the storage 48. A STOPI module 49 may comprise hardware/software for providing STOPI measurements and determinations.

In some embodiments, the STOPI algorithms may be located in the STOPI module 49. In other embodiments, the STOPI algorithms may be located on programmable logic controllers (PLCs) that control the drilling rig actuators themselves. In some embodiments, the STOPI algorithms may be implemented in a software layer above the PLC layer. Systems and methods that reduce or dampen torsional drillstring vibrations, in particular slip-stick oscillations and torsional drillstring resonances (mitigation slip stick control), may be used with a rig control system as disclosed in US Publication No. 2016/0290046, incorporated herein by reference in its entirety.

Figure 3:
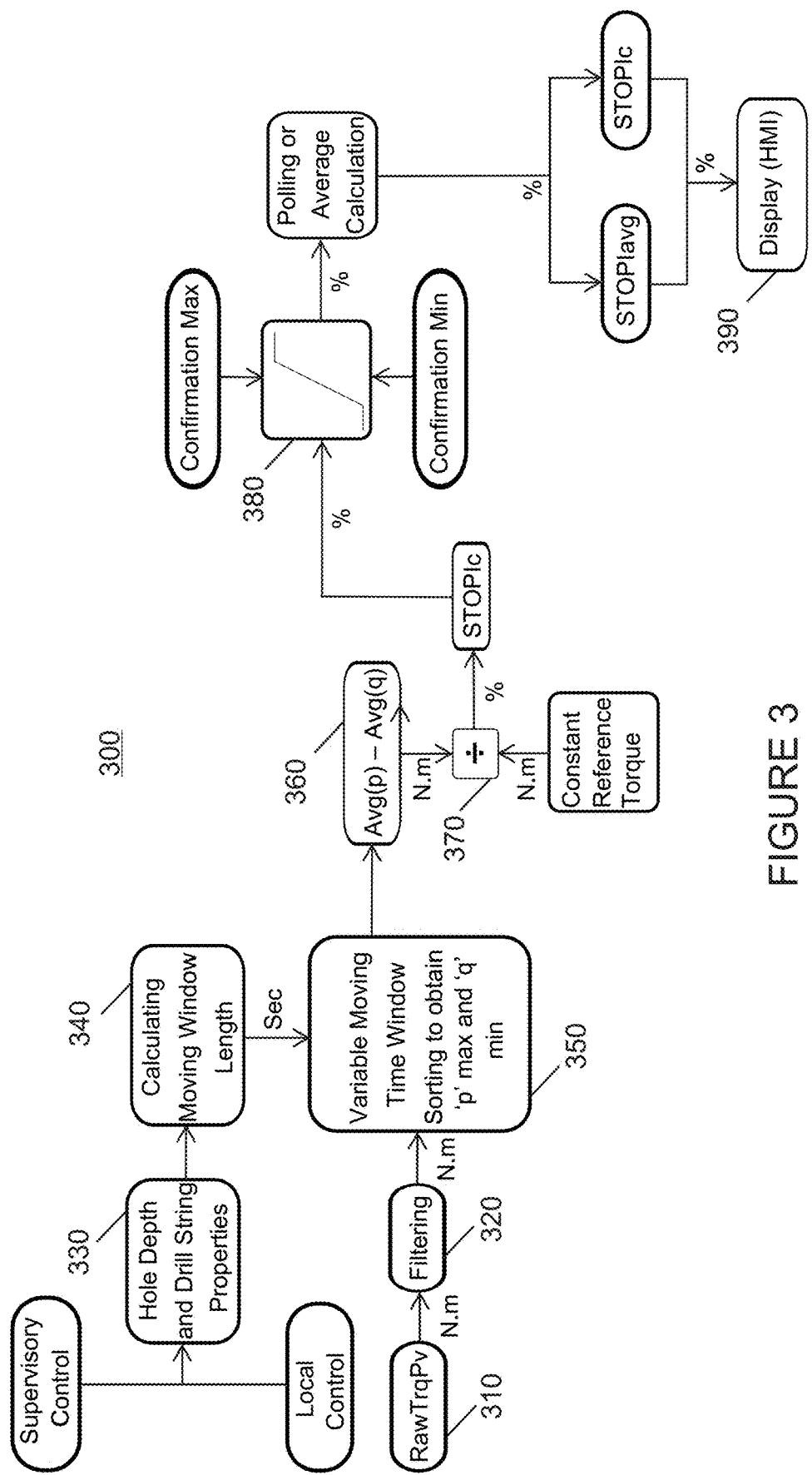
FIG. 3 is a flow chart of an algorithm for measuring surface torque oscillations of a drill string.

Referring to FIG. 3, a block diagram of algorithm 300 according to one aspect of the present invention is illustrated. The first step of algorithm 300 is to collect 310 the torque present value (RawTrqPv), which may be collected from either the VFD related to the top drive 15 (not shown in FIG. 1), or a torque sub located between the top drive 15 and the drillstring 17 (also not shown in FIG. 1).

Next, the torque present value (RawTrqPv) data is low pass or band pass filtered 320. The cutoff frequencies are predetermined fixed values. If the formations to be drilled for the well are known as fairly constant, low pass filter may apply, otherwise, band pass filter should apply.

Parameters of the drill string length (hole depth) and drill string properties are then collected 330 from either local control or supervisory control at higher level of a hierarchical control network.

The algorithm 300 then calculates 340 the length of the moving window by first estimating the fundamental oscillation time period $T_1$. Any existing technique may be used to derive the fundamental time period $T_1$. For example, one method is to use equations (1)-(3) from A. Kyllinstad and G. W. Halsey, "A Study of Slip/Stick Motion of the Bit," SPE Drilling Engineering, pgs. 369-373, December 1988, incorporated herein by its entirety. For a drillstring composed of a drillpipe section of length $L_1$ and a uniform drill-collar section of length $L_2$, a good approximation for inertia is $$J = \frac{\rho I_1 L_1}{3} + \rho I_2 L_2 \quad (1)$$

where J is the moment of inertia of the drill string, i is density, and $I_1$ and $I_2$, respectively, are the cross-sectional polar moments of drilling pipe and drill collar. The torsional stiffness K is just $$K = G \frac{I_1}{L_1} \quad (2)$$

where G is the shear modulus of the drillstring material. Where $$\sqrt{\frac{K}{J}}$$

is the angular eigen frequency, the fundamental time period $T_1$ is calculated as $$T_1 = \frac{2\pi}{\sqrt{\frac{K}{J}}} \quad (3)$$

Equation (4) establishes the time interval T for the moving window where a is a safety factor typically set between 1.0 and 2.0 to ensure the moving window covers a full cycle of oscillation at the time. Based on T, the length of moving window can be determined by dividing the control system sampling time $\Delta T$ with T. If necessary, the window length is rounded to be an integer.

$$T = \alpha T_1 \quad (4)$$

Next, the algorithm 300 sorts 350 the stored torque value array (with the size of window length) to obtain the largest values p and lowest values q, where p and q are integers equal to or larger than 1.

Algorithm 300 then subtracts 360 the average of the q values from the average of the p values derived from the sorted torque value array. The difference between the two resulting average values provides an amplitude of torsional fluctuations.

The next step in the algorithm 300 is to divide 370 the resulting difference value (amplitude of torsional fluctuations) by selected constant reference torque values. The default setting is a rated torque of the top drive 15. The reference torque values can also be off-bottom torque, at-bottom torque, etc. Off-bottom torque is measured by rotating off bottom (ROffB), which is where the pipe rotates without any axial movement, such as rate of penetration or tripping, there is no weight on bit (WOB) or torque on bit (TOB) because the bit is not engaged with the formation. At-bottom torque is measured by rotating on bottom (ROnB), which is where the pipe rotates without any axial movement, such as rate of penetration or tripping, but weight on bit (WOB) and torque on bit (TOB) are present because bit is engaged with the formation. The selection of reference torque may be dependent on the availability and the choice of rig personnel. The quotient of the division is a Surface Torque Oscillation Performance Index (STOPI).

According to a further step of the algorithm 300, the STOPI value calculated from the division step is limited 380 between a configurable maximum and minimum.

Finally, the algorithm 300 displays 390 the STOPI on an external display such as a HMI or a computer screen. The display update time is generally longer than ZIT. Therefore, the algorithm 300 may use either a polling method or the average value for the purpose of display.

In addition, the algorithm 300 steps are executed as STOPI calculation is enabled. When the calculation is disabled based on preset conditions (such as bit not at bottom, TD speed setpoint changes, and drilling controller off), a 'null' value or a high mark integer value would be assigned to STOPI for logging, which also clarifies the 'disabled' status without misleading.

Figure 4:
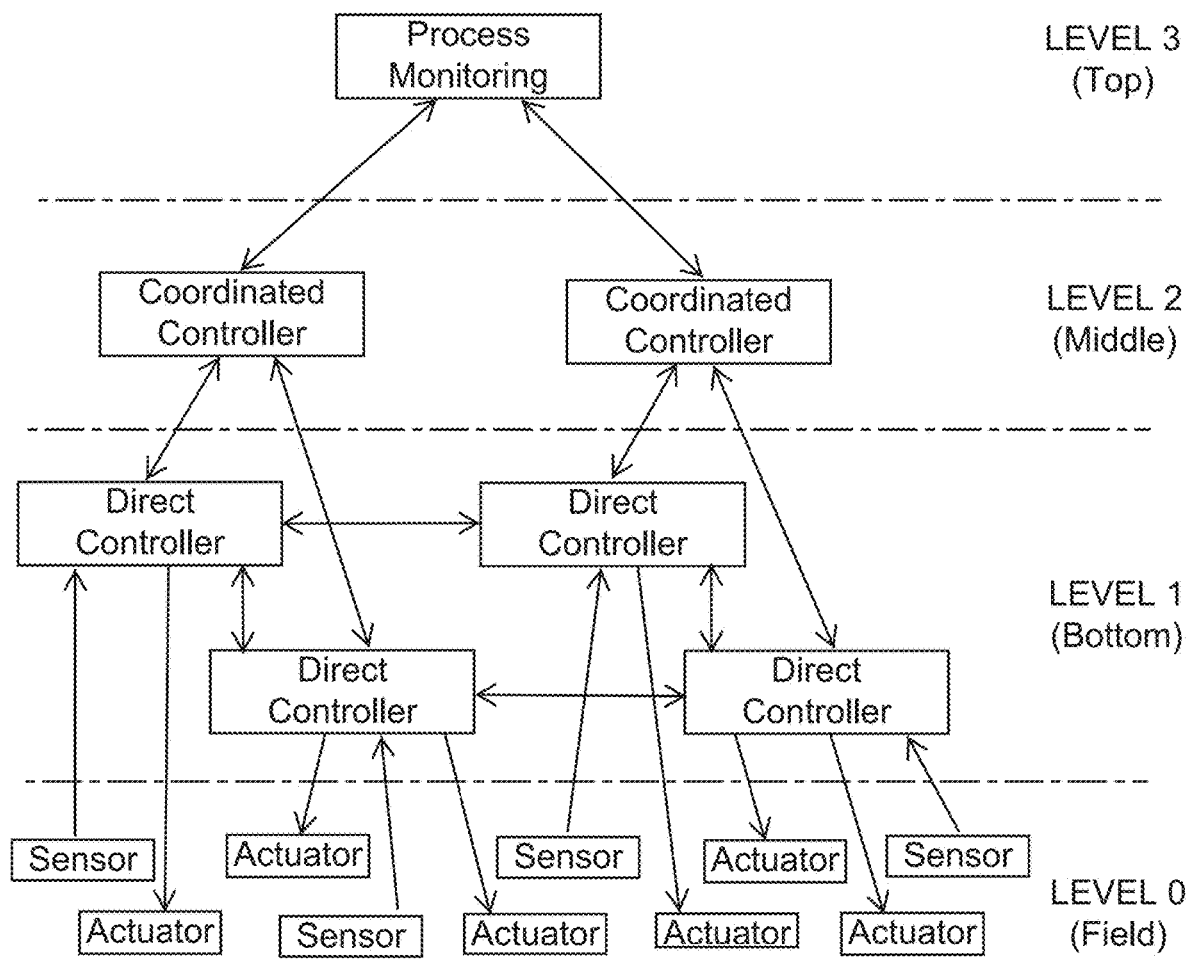
FIG. 4 is a schematic diagram illustrating levels of control devices in a control architecture.

The STOPI algorithm can be implemented as part of the rig control system. Referring to FIG. 4, control levels are illustrated for a drilling rig control system. A significant difference between each of the control levels is to what degree software programs or algorithms may be edited or reprogrammed after the original software programs or algorithms have been embedded in the hardware. A further distinction between the levels is the speed of the communications between devices at the control level.

Level 0 (Field) comprises sensors and actuators for a variety of drilling subsystems. Example subsystems include a drilling fluid circulation system (which may include mud pumps, valves, fluid reconditioning equipment, etc.), a rig control system (which may include hoisting equipment, drillstring rotary mover equipment (such as a top drive and/or rotary table), a PHM, a catwalk, etc.), a managed pressure drilling system, a cementing system, a rig walk system, etc. Level 0 (Field) may comprise a high speed controller, such as a variable frequency drive (VFD). Level 0 (Field) hardware devices may be programmed with software by the manufacturer and the software may be less suitable for modification unless performed by the manufacturer.

Level 1 (Bottom) comprises direct control devices for directly controlling the Level 0 (Field) subsystems. Level 1 (Bottom) direct controllers can include programmable logic controllers (PLCs), processors, industrial computers, personal computer based controllers, soft PLCs, the like, and/or any example controller configured and operable to receive sensor data from subsystem sensors and/or transmit control instructions to subsystem equipment. Level 1 (Bottom) processors may be, comprise, or be implemented by one or more processors of various types operable in the local application environment, and may include one or more general purpose processors, special-purpose processors, microprocessors, digital signal processors (DSPs), field-programmable gate arrays (FPGAs), application-specific integrated circuits (ASICs), processors based on a multi-core processor architecture, and/or other processors. More particularly, examples of a processor include one or more INTEL microprocessors, microcontrollers from the ARM and/or PICO families of microcontrollers, embedded soft/hard processors in one or more FPGAs, etc. Sensors and various other components may transmit sensor data and/or status data to a direct controller, and controllable components may receive commands from a direct controller to control operations of the controllable components. One or more aspects disclosed herein may allow communication between direct controllers of different subsystems through virtual networks. Sensor data and/or status data may be communicated through virtual networks and a common data bus between direct controllers of different subsystems. Level 1 (Bottom) direct controllers may be programmed and deployed, but with relative difficulty. Programmed software may thereafter be configured and edited, but with relative difficulty. Only very rigid computer programming is possible. A field bus is used to communicate with Level 1 (Bottom) direct controllers via protocols, such as Ethernet CAT, ProfiNET, ProfiBus, Modbus, etc. Processor 43 is an example of a Level 1 (Bottom) device. (See FIG. 2).

Level 2 (Middle) comprises coordinated control devices. These include a variety of computing devices, for example, computers, such as industrial PC, processors, domain controllers, programmable logic controllers (PLCs), industrial computers, personal computers based controllers, soft PLCs, the like, and/or any example controller configured and operable to receive information and data available on a Level 2 network, and transmit control commands and instructions to direct controllers at Level 1, which directly control subsystem equipment. Level 2 (Middle) processors may be, comprise, or be implemented by one or more processors of various types operable in the local application environment, and may include one or more general purpose processors, special-purpose processors, microprocessors, digital signal processors (DSPs), field-programmable gate arrays (FPGAs), application-specific integrated circuits (ASICs), processors based on a multi-core processor architecture, and/or other processors. More particularly, examples of a processor include one or more INTEL microprocessors, microcontrollers from the ARM and/or PICO families of microcontrollers, embedded soft/hard processors in one or more FPGAs, etc. Level 2 (Middle) coordinated controllers may be programmed and deployed relatively easily as high level programming languages, such as C/C++, may be used with software program running in a real time operating system (RTOS). A real time communication databus is used to communicate with Level 2 (Middle) coordinated controllers via protocols, such as TCP/IP and UDP.

Level 3 (Top) comprises process monitoring devices that do not control, but merely monitor activity and provide information to the controlling devices at lower levels. Any computing device known to persons of skill in the art may perform Level 3 functions.

A control system implementing the STOPI algorithm may either be implemented in PLC at Level 1 (Bottom), or in an industrial PC running a real time operating system at Level 2 (Middle), or in a server computer or a virtual machine at any level. Typically, the STOPI algorithm may be implemented either on PLCs at Level 1 (Bottom) or in a middleware software layer at Level 2 (Middle). A supervisory controller that may implement mitigation slip stick controls may be implemented either in a middleware software layer at Level 2 (Middle) or at Level 3 (Top).

According to one embodiment of the invention, a surface torque oscillation performance index (STOPI) is displayed on a display 46 (see FIG. 2) and a human drilling operator may then use the STOPI to decide whether to modify a drilling parameter. For example, in response to a displayed STOPI, the drilling operator may decide whether to modify the drill string rotational speed, the weight of the drill string on the drilling rig, and/or the rate of penetration. As a further example, the drilling operator may decide whether to start, stop or modify a slip stick mitigation control.

Figure 5A:
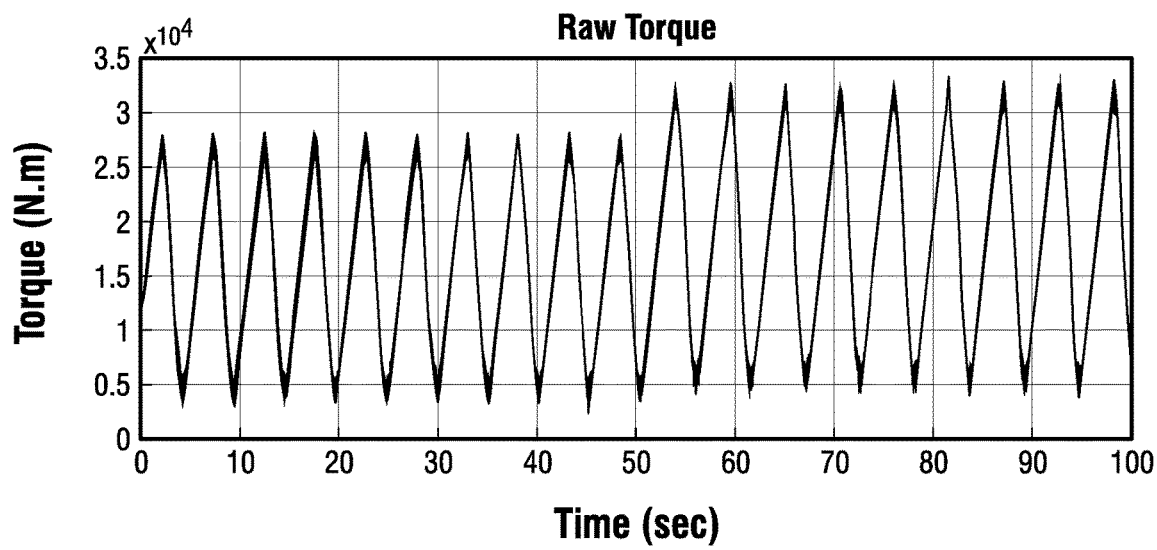
FIG. 5A is a plot of raw torque values for a drill string simulation model.
Figure 5B:
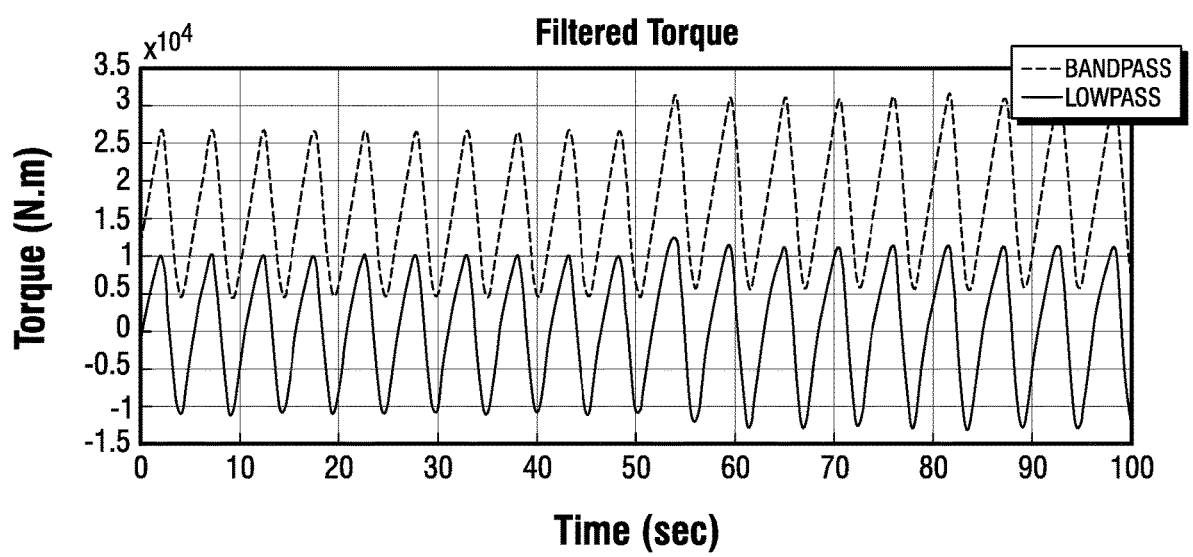
FIG. 5B is a plot of low pass and band pass filtered torque values for the drill string simulation model.
Figure 5C:
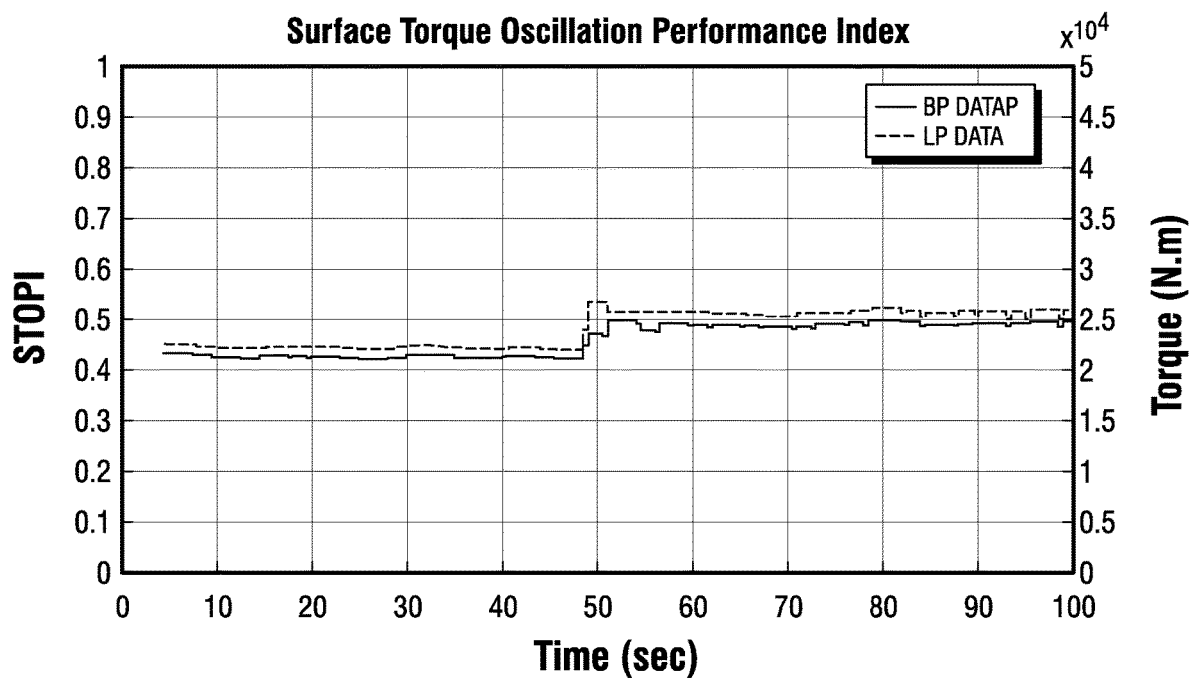
FIG. 5C is a double y-axis plot of data for the drill string simulation model, wherein the left axis shows STOPI values and the right axis shows the oscillation magnitudes.

Referring to FIGS. 5A through 5C, example data collected from a drill string simulation model is illustrated for the STOPI algorithm. FIG. 5A shows raw torque values from the drill string simulation model. FIG. 5B illustrates the low pass and band pass filtered torque values from the drill string simulation model. FIG. 5C shows a double y-axis plot as left axis shows STOPI values and right axis shows the oscillation magnitudes. TD rated torque of 50,000 N·m is used as reference torque (denominator). In this drill string simulation model example, the moving window time T is at 5 secs where the oscillation frequency is at about 0.21 Hz. A polling method shows a new STOPI value every 500 ms and ΔT=1 ms.

Figure 6A:
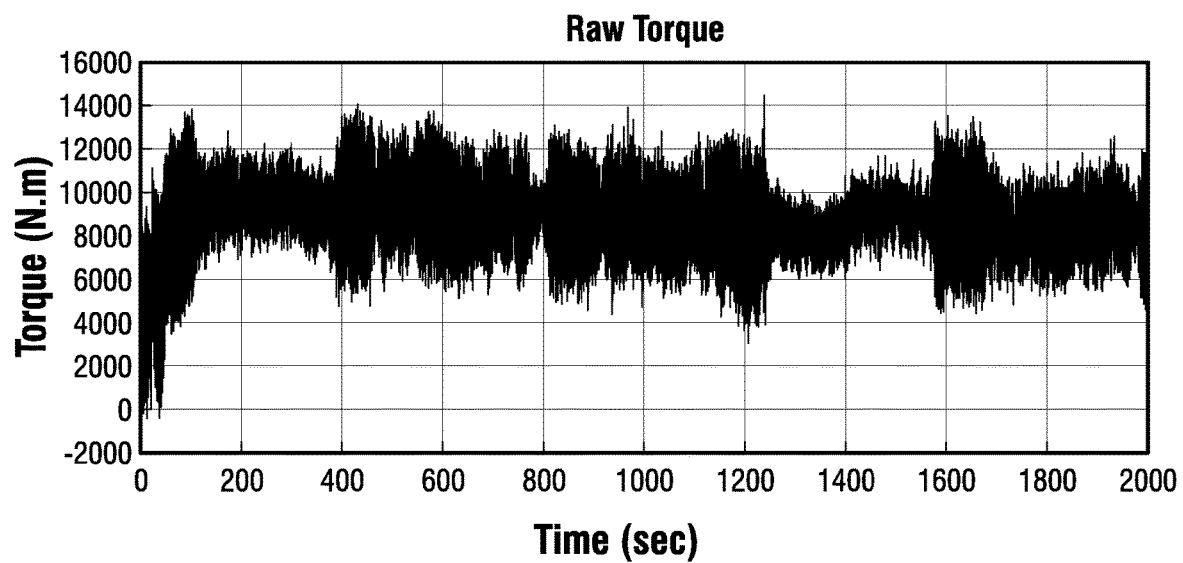
FIG. 6A is a plot of raw torque values for a drill string field test.
Figure 6B:
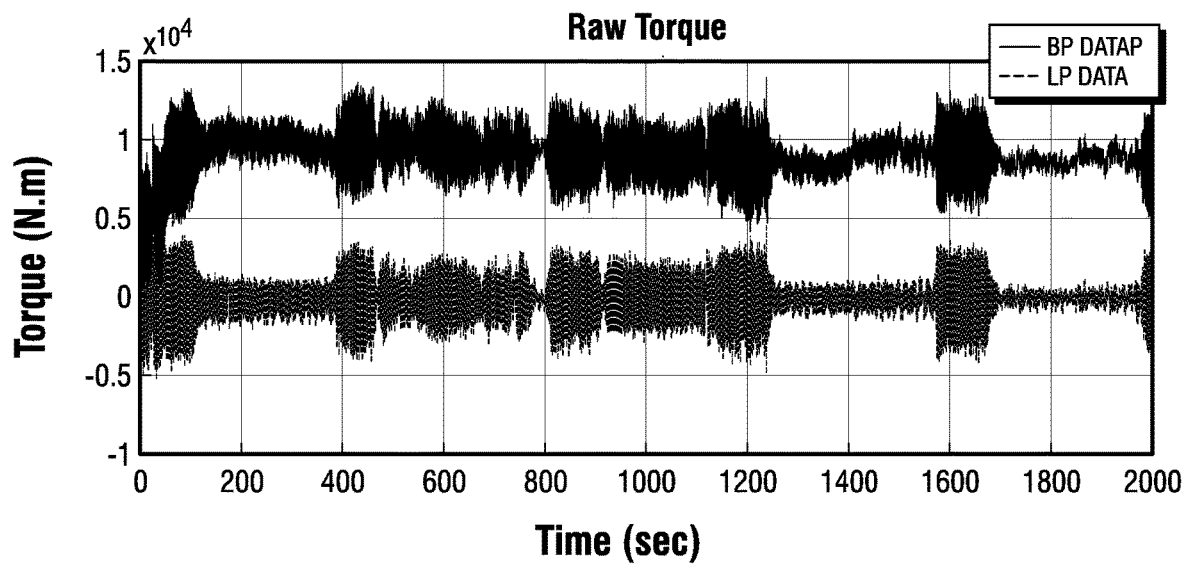
FIG. 6B is a plot of low pass and band pass filtered torque values for the drill string field.
Figure 6C:
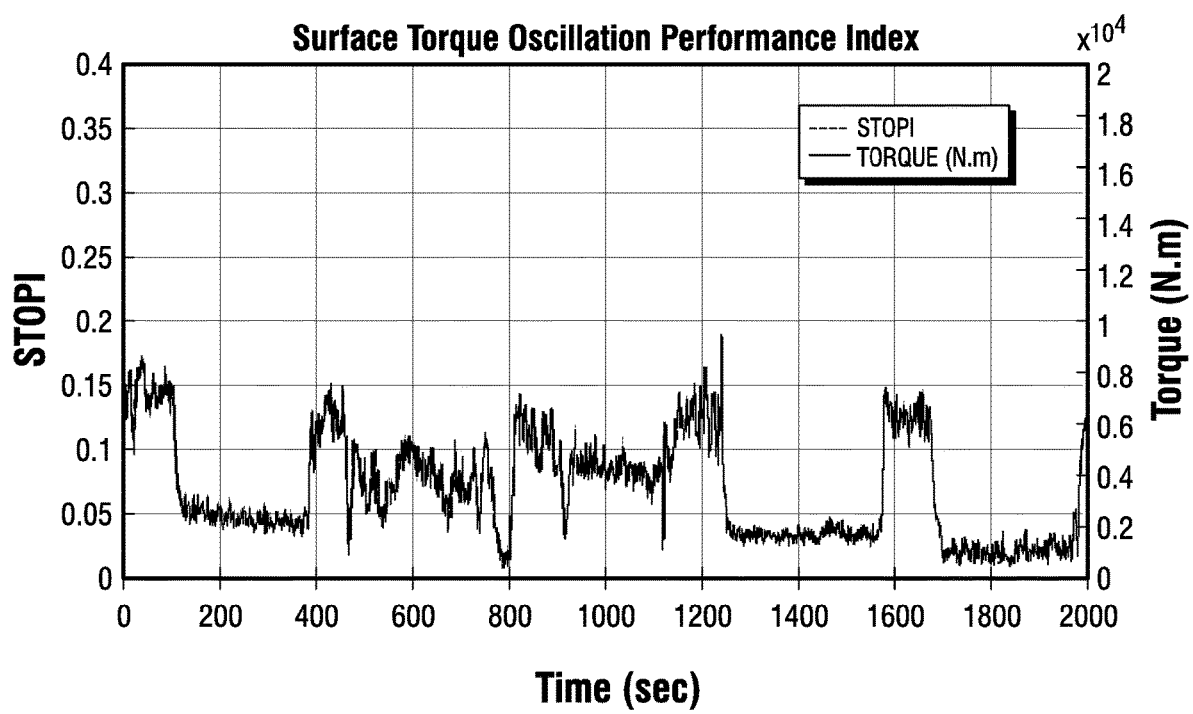
FIG. 6C is a double y-axis plot of data for the drill string field test, wherein the left axis shows STOPI values and the right axis shows the oscillation magnitudes.

Referring to FIGS. 6A through 6C, example data collected from a drill string field test is illustrated for the STOPI algorithm. FIG. 6A shows raw torque values from the drill string simulation model. FIG. 6B illustrates the low pass and band pass filtered torque values from the drill string simulation model. FIG. 6C shows a double y-axis plot as left axis shows STOPI values and right axis shows the oscillation magnitudes. TD rated torque of 50,000 N·m is used as reference torque (denominator). In this drill string field test example, the moving window time T=2 sec and the fundamental frequency is about 0.67 Hz. STOPI values are shown every ΔT=5 ms.

In alternative embodiments, drilling control methods implement a combination of control algorithms based on at least one of the algorithms disclosed in this specification with any other known control algorithm. It is specifically contemplated that control algorithms are implemented in combination.

Although the disclosed embodiments are described in detail in the present disclosure, it should be understood that various changes, substitutions and alterations can be made to the embodiments without departing from their spirit and scope.

What is claimed is:

1. A method for drilling a wellbore with a drill rig, the method comprising:
    rotating a drill string and a drill bit with a drill rig drive system;
    applying a weight of the drill string on the drill rig; and
    measuring surface torque oscillations of the drill string, comprising:
    determining a fundamental oscillation time period;
    selecting a time window based on the fundamental oscillation time period;
    collecting torque present value data of the drill string for the selected time window;
    determining an amplitude of torque oscillation from the collected torque present value data;
    determining a reference torque; and
    dividing the determined amplitude of torque oscillation by the determined reference torque to obtain a surface torque oscillation performance index, whereby the measurement of the surface torque oscillations of the drill string is a fractional value to indicate the magnitude and severity of surface torque fluctuations of the drilling string.

2. The method for drilling a wellbore as claimed in claim 1, further comprising modifying at least one drilling parameter based on the surface torque oscillation performance index.

3. The method for drilling a wellbore as claimed in claim 1, further comprising displaying the surface torque oscillation performance index on a display.

4. The method for drilling a wellbore as claimed in claim 1, wherein the determining a fundamental oscillation time period comprises determining based on at least one drill string parameter selected from: drill string length, drill string shear modulus, and drill string density.

5. The method for drilling a wellbore as claimed in claim 1, wherein the determining the fundamental oscillation time period comprises estimating based on at least one drill string parameter selected from: drill string length, drill pipe length, drill collar length, string shear modulus, string stiffness, drill string moment of inertia, drill string density, drill pipe polar moment, and drill collar polar moment.

6. The method for drilling a wellbore as claimed in claim 1, wherein determining the reference torque comprises measuring at least one of: an off-bottom torque, an at-bottom torque, and a top drive rated torque.

7. The method for drilling a wellbore as claimed in claim 1, wherein measuring the surface torque oscillations of the drill string further comprises:
    filtering the collected torque present value data;
    sorting the filtered torque present value data to obtain a set of large values p and a set of small values q;
    averaging the set of large values p and averaging the set of small values q; and
    subtracting the average of the set of small values q from the average of the set of large values p to obtain an amplitude of torsional fluctuations;
    wherein the dividing collected torque present value data by the determined reference torque comprises dividing the amplitude of torsional fluctuations by the determined reference torque to obtain the surface torque oscillation performance index.

8. The method for drilling a wellbore as claimed in claim 6, wherein the filtering the collected torque present value data comprises at least one of: low pass filtering of frequencies at a predetermined fixed value, and band pass filtering of frequencies at predetermined fixed values.

9. The method for drilling a wellbore as claimed in claim 2, wherein the modifying at least one drilling parameter comprises modifying at least one drilling parameter selected from: drill string rotational speed, weight of the drill string on the drilling rig, slip stick mitigation control, and rate of penetration.

10. The method for drilling a wellbore as claimed in claim 1, further comprising averaging the surface torque oscillation performance indexes for selected fundamental oscillation time periods.

11. The method for drilling a wellbore as claimed in claim 1, further comprising polling the surface torque oscillation performance indexes for selected fundamental oscillation time periods.

12. A controller of a drill rig system having a drill string and a drill bit, the controller comprising:
    a rotation receptor that receives a signal corresponding to drill string rotation speed at the drill rig;
    a torque receptor that receives a signal corresponding to torque applied to the drill string at the drill rig;
    a processor;
    a non-transitory storage medium; and
    a set of computer readable instructions stored in the non-transitory storage medium, wherein when the instructions are executed by the processor allow the controller to measure surface torque oscillations of the drill string by:
    determining a fundamental oscillation time period;
    selecting a time window based on the fundamental oscillation time period;
    collecting torque present value data of the drill string for the selected time window;
    determining an amplitude of torque oscillation from the collected torque present value data;
    determining a reference torque; and
    dividing the determined amplitude of torque oscillation by the determined reference torque to obtain a surface torque oscillation performance index, whereby the measurement of the surface torque oscillations of the drill string is a fractional value to indicate the magnitude and severity of surface torque fluctuations of the drilling string.

13. The controller of a drill rig system as claimed in claim 12, wherein the determining a fundamental oscillation time period comprises determining based on at least one drill string parameter selected from: drill string length, drill string shear modulus, and drill string density.

14. The controller of a drill rig system as claimed in claim 12, wherein the determining the fundamental oscillation time period comprises estimating based on at least one drill string parameter selected from: drill string length, drill pipe length, drill collar length, string shear modulus, string stiffness, drill string moment of inertia, drill string density, drill pipe polar moment, and drill collar polar moment.

15. The controller of a drill rig system as claimed in claim 12, wherein determining the reference torque comprises measuring at least one of: an off-bottom torque, an at-bottom torque, and a top drive rated torque.

16. The controller of a drill rig system as claimed in claim 12, wherein the set of computer readable instructions stored in the non-transitory storage medium comprise further instructions, wherein when the further instructions are executed by the processor allow the controller to measure the surface torque oscillations of the drill string by:
  filtering the collected torque present value data;
  sorting the filtered torque present value data to obtain a set of large values p and a set of small values q;
  averaging the set of large values p and averaging the set of small values q; and
  subtracting the average of the set of small values q from the average of the set of large values p to obtain an amplitude of torsional fluctuations;
  wherein the dividing collected torque present value data by the determined reference torque comprises dividing the amplitude of torsional fluctuations by the determined reference torque to obtain the surface torque oscillation performance index.

17. The controller of a drill rig system as claimed in claim 16, wherein the filtering the collected torque present value data comprises at least one of: low pass filtering of frequencies at a predetermined fixed value, and band pass filtering of frequencies at predetermined fixed values.

18. The controller of a drill rig system as claimed in claim 12, wherein the set of computer readable instructions stored in the non-transitory storage medium comprise further instructions, wherein when the further instructions are executed by the processor allow the controller to modify at least one drilling parameter selected from: drill string rotational speed, weight of the drill string on the drilling rig, slip stick mitigation control, and rate of penetration.

19. The controller of a drill rig system as claimed in claim 12, wherein the set of computer readable instructions stored in the non-transitory storage medium comprise further instructions, wherein when the further instructions are executed by the processor allow the controller to display the surface torque oscillation performance index.

20. The controller of a drill rig system as claimed in claim 12, wherein the set of computer readable instructions stored in the non-transitory storage medium comprise further instructions, wherein when the further instructions are executed by the processor allow the controller to average the surface torque oscillation performance indexes for selected fundamental oscillation time periods.

21. The controller of a drill rig system as claimed in claim 12, wherein the set of computer readable instructions stored in the non-transitory storage medium comprise further instructions, wherein when the further instructions are executed by the processor allow the controller to poll the surface torque oscillation performance indexes for selected fundamental oscillation time periods.

22. The controller of a drill rig system as claimed in claim 12, wherein the non-transitory storage medium is implemented in a control device selected from PLC at Level 1 (Bottom), and an industrial PC running middleware software at Level 2 (Middle).

* * * * *